No. 672,749. Patented Apr. 23, 1901.
C. L. BAENDER.
CAN CAPPING MACHINE.
(Application filed May 12, 1900.)
(No Model.)
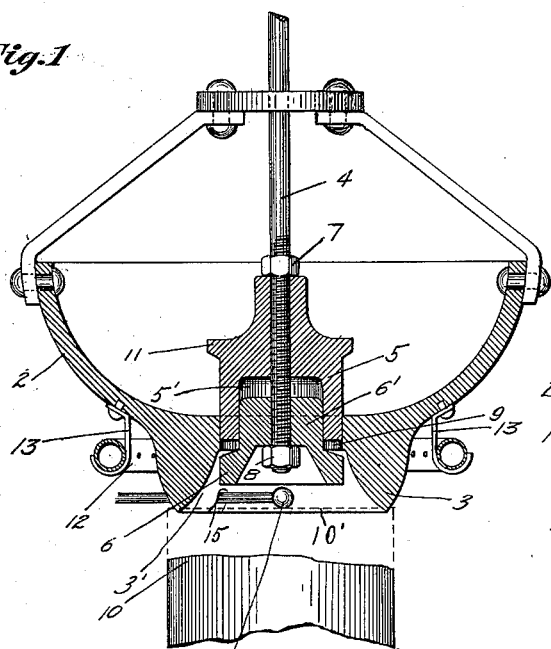
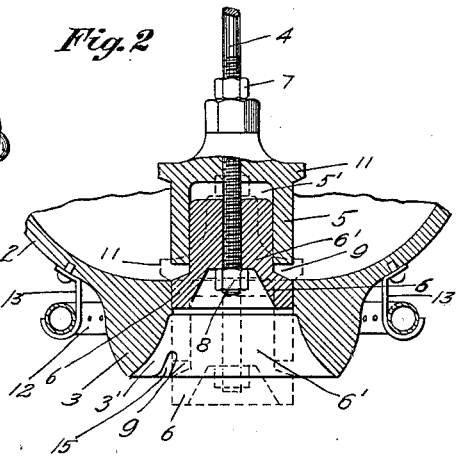
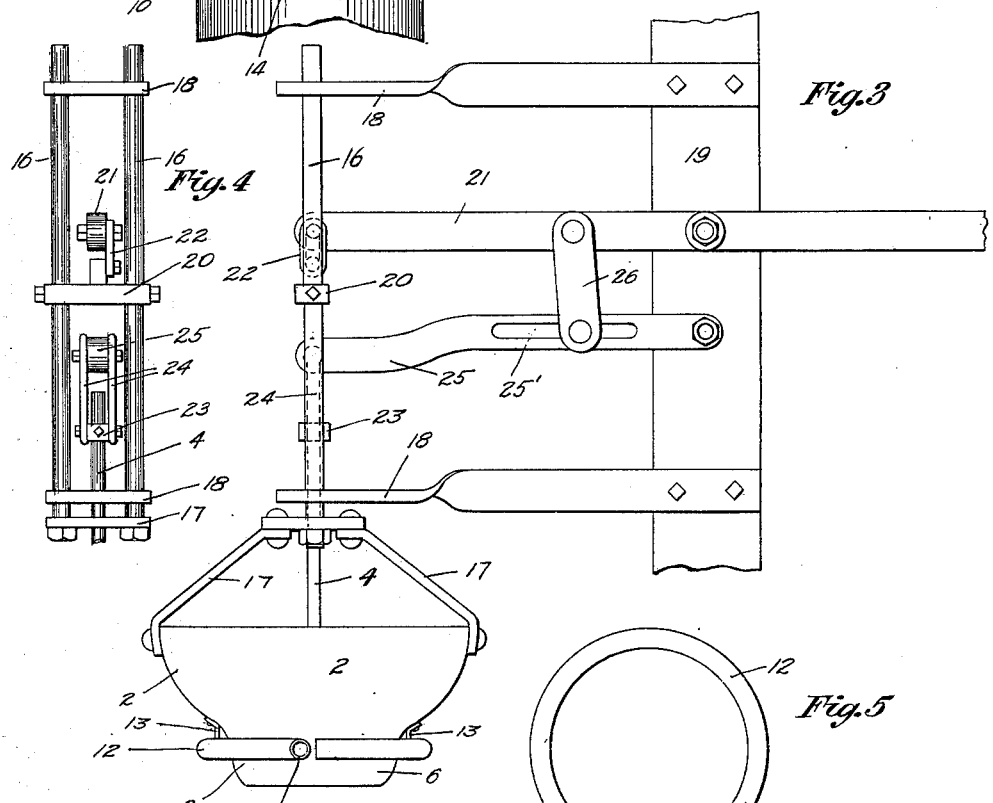
Witnesses
Harry G. Wiseman
Inventor
C. L. Baender
Attorney

UNITED STATES PATENT OFFICE.

CHARLES L. BAENDER, OF PITTSBURG, PENNSYLVANIA.

CAN-CAPPING MACHINE.

SPECIFICATION forming part of Letters Patent No. 672,749, dated April 23, 1901.

Application filed May 12, 1900. Serial No. 16,414. (No model.)

*To all whom it may concern:*

Be it known that I, CHARLES L. BAENDER, a citizen of the United States, residing at Pittsburg, in the county of Allegheny and State of Pennsylvania, have invented new and useful Improvements in Can-Capping Machines, of which the following is a specification.

This invention relates to machines for soldering the caps or covers on tin cans; and its primary object is to provide improved mechanism for delivering a predetermined amount of solder for each soldering operation and also to make such mechanism adjustable to deliver greater or less amounts, as required.

Further objects are to provide a combined melting-pot and soldering-iron of improved form and to provide improved actuating mechanism.

The invention consists in the novel features of construction and in the combination and arrangement of parts hereinafter fully described and claimed, and illustrated by the accompanying drawings, in which—

Figure 1 is a vertical sectional view of the operative part of the machine, showing the solder delivering or ejecting plunger in lowered position, as when delivering the solder to the iron. Fig. 2 is a similar view of the lower portion of the machine, the plunger being shown raised in solid lines to receive the solder and in dotted lines in extreme lowered position for cleaning the plunger. Figs. 3 and 4 are detail views of a form of actuating mechanism. Fig. 5 is a similar view of the burner which encircles the melting-pot.

Referring to the drawings, 2 indicates the solder-melting pot, open at the top and formed with a central annular opening in the bottom. Depending from the bottom of the pot is the circular soldering-iron 3, here shown downwardly tapering in cross-section and integral with the pot, though not necessarily so. Extending axially through the pot is rod 4, threaded at the lower end to receive the threaded plunger-sections 5 and 6, and also lock-nuts 7 and 8. Plunger-section 5 is cored out at 5', and section 6 is reduced at 6' to fit thereinto, so that the annular space or pocket 9 between said sections, and in the outer wall of the plunger, may be enlarged or contracted to receive a greater or less amount of solder from the pot when in raised position (shown in solid lines in Fig. 2) and deliver it to the inner tinned wall or face 3' of iron 3. As the plunger snugly fits the bottom opening in the pot, no solder can escape from the latter excepting in pocket 9, so that each charge is accurately gaged and may be varied in amount by raising or lowering plunger-section 5 on rod 4. The annular edge of iron 3 fits the solder-groove of can 10, and the latter or the iron is rotated by suitable mechanism. (Not shown.) Wall or face 3' of the iron being tinned, the molten solder flows freely thereover, and the discharge thereon from annular pocket 9 being equal at all points the work is made uniform.

Plunger-section 5 is formed at its upper end with flange 11, which when the plunger is lowered into position (shown in dotted lines in Fig. 2) sustains the latter with the pot sealed against the discharge of solder, and with the plunger thus projected it and pocket 9 may be effectually cleaned.

12 is a substantially circular burner sustained by hangers 13 exterior of the pot and iron and in such position as to maintain the pot and iron at proper temperature and with the solder in a molten state, the latter being supplied to the pot in lumps or in any other preferred form. Burner 12 is closed at one end and outwardly turned at 12' at the other end to receive a gas-supply hose. (Not shown.) 14 is a finger projected into the iron through slot 15 in the latter for engaging the can-top 10 and holding it in place during the soldering operation.

In operation either the can or the soldering mechanism may be moved vertically to bring said elements together for the soldering operation. I here show mechanism for vertically moving the soldering-machine, and the same consists of rods 16, rigid with frame 17, raised from the top of pot 2, said rods working through fixed guides 18, projecting laterally from support 19. Vertically adjustable on rods 16 is head 20, to which operating-lever 21 is connected by link 22, the lever being fulcrumed to support 19. Adjustable on the upper portion of plunger-rod 4 is head 23, connected by links 24 to lever 25, the latter being fulcrumed to support 19 beneath lever 21 and adjustably secured to the latter by link 26, lever 25 being slotted at 25' to provide for said adjustment, whereby the relative vertical movements of the plunger and pot may be varied. With the mechanism here shown the soldering-machine may be raised or lowered on the levers, and the fixed guides will always hold it in vertical line. However, I do not restrict myself to the actuating mechanism here shown, as the pot and plunger may be operated in a variety of ways, or the plunger alone may be caused to operate, the pot remaining fixed, with the can movable with relation thereto.

In using the term "pot" in connection with the solder-container I do not thereby restrict myself to a melting-pot. Said element may be styled a "reservoir" or "container," in which the solder is preferably, though not necessarily, reduced to molten state.

Having thus fully described my invention, what I claim as new, and desire to secure by Letters Patent, is—

1. In a soldering-machine, the combination of a solder-container, an iron, mechanism for delivering predetermined quantities of solder from the container to the iron, and means for adjusting said delivering mechanism, whereby said quantities of solder may be varied, substantially as shown and described.

2. In a soldering-machine, the combination of a pot, a soldering-iron, mechanism adapted to deliver a predetermined quantity of solder to the iron at each operation of the machine, and means for varying the quantity of solder carried by said delivering mechanism, substantially as shown and described.

3. In a soldering-machine, an iron having an elongated operating edge, in combination with mechanism above said operating edge from which solder is delivered to the iron in a horizontally-elongated stream, the solder flowing to all portions of the edge simultaneously.

4. In a soldering-machine, the combination of a pot, a soldering-iron, a plunger working through an aperture in the pot, the plunger being provided with an adjustable pocket adapted to deliver variable quantities of solder to the iron, substantially as shown and described.

5. In a soldering-machine, the combination of a pot, a soldering-iron, a plunger working through an aperture in the pot, the plunger being in sections adjustable with relation to each other to form a pocket in the plunger of variable size to deliver variable charges of solder from the pot to the iron, substantially as shown and described.

6. In a soldering-machine, the combination of a pot, a soldering-iron, a plunger working through an aperture in the pot and formed in telescoping sections adjustable with relation to each other to form a peripheral pocket in the plunger of variable size to deliver variable charges of solder from the pot to the iron, substantially as shown and described.

7. In a soldering-machine, the combination of a pot, a soldering-iron, a plunger working through an aperture in the pot, an actuating-rod, the plunger being formed in sections adjustable toward and away from each other on the rod to form a pocket of variable size between adjacent ends of the sections for delivering variable charges of solder from the pot to the iron, substantially as shown and described.

8. In a soldering-machine, the combination of a pot formed with an opening in the bottom, a circular soldering-iron depending from the pot and encircling the opening, and a plunger working through said opening and adapted to deliver solder to the inner face of the iron, substantially as shown and described.

9. In a soldering-machine, the combination of a pot formed with an opening in the bottom, a circular soldering-iron depending from the pot and encircling the opening, and a measuring-plunger working through the opening and adapted to deliver predetermined charges of solder from the pot to the inner face of the iron at each operation of the machine, substantially as shown and described.

10. In a soldering-machine, the combination of a pot formed with a bottom opening, a circular soldering-iron depending from the pot and encircling the opening, and a plunger working through the opening and formed on its periphery with an annular pocket to receive a charge of solder from the pot and evenly distribute it to all parts of the inner face of the circular iron, substantially as shown and described.

11. In a soldering-machine, the combination of a pot, a circular soldering-iron integral with and depending from the pot and tapering to an annular operating edge, and mechanism for delivering solder from the pot to the iron, substantially as shown and described.

12. In a soldering-machine, the combination of a pot, a soldering-iron beneath the pot, a solder-delivering plunger working through an opening in the bottom of the pot, and mechanism for moving the pot and plunger vertically at different speeds, substantially as shown and described.

13. In a soldering-machine, the combination of a pot, a soldering-iron beneath the pot, a solder-delivering plunger working through an opening in the bottom of the pot, a support, two levers fulcrumed to the support and connected at their free ends to the pot and plunger respectively, and a link adjustably connecting the levers, whereby the pot and plunger may be moved vertically at different relative speeds, substantially as shown and described.

14. In a soldering-machine, the combination of a pot, a soldering-iron, the rods raised vertically from the pot, fixed guides for the rods, lever 21 to which the rods are adjustably connected, lever 25 to which the solder-delivering plunger is adjustably connected, and an adjustable link connection between levers 21 and 25, substantially as shown and described.

15. A soldering-iron having a horizontally-elongated operating edge, in combination with means for delivering molten solder to said edge in a horizontally-elongated sheet, substantially as shown and described.

In testimony whereof I have hereunto set my hand in presence of two subscribing witnesses.

CHARLES L. BAENDER.

Witnesses:
ALEX. S. MABON,
J. M. NESBIT.